United States Patent [19]

Agrawal

[11] Patent Number: 4,462,700
[45] Date of Patent: Jul. 31, 1984

[54] HYDRODYNAMIC FLUID FILM THRUST BEARING

[75] Inventor: Giridhari L. Agrawal, Simsbury, Conn.

[73] Assignee: United Technologies Corporation, Hartford, Conn.

[21] Appl. No.: 324,220

[22] Filed: Nov. 23, 1981

[51] Int. Cl.³ .............................................. F16C 32/06
[52] U.S. Cl. .................................... 384/105; 384/106
[58] Field of Search ............... 384/105, 103, 104, 106, 384/125, 124

[56] References Cited

U.S. PATENT DOCUMENTS

| | | |
|---|---|---|
| 2,897,026 | 7/1959 | Haller et al. . |
| 3,382,014 | 5/1968 | Marley . |
| 3,893,733 | 7/1975 | Silver et al. . |
| 4,208,076 | 6/1980 | Gray et al. .......................... 384/105 |
| 4,213,657 | 7/1980 | Gray . |
| 4,225,196 | 9/1980 | Gray . |
| 4,227,752 | 10/1980 | Wilcock . |
| 4,274,683 | 6/1981 | Gray et al. .......................... 384/106 |
| 4,331,365 | 5/1982 | Miller ................................. 384/105 |

*Primary Examiner*—Lenard A. Footland
*Attorney, Agent, or Firm*—John Swiatocha

[57] ABSTRACT

A hydrodynamic fluid film thrust bearing including a stationary thrust plate 15, a rotating thrust runner 20 spaced therefrom, and at least one foil 50 disposed therebetween, is provided with first and second sets 25 and 45 of overlying resilient backing members in axial alignment with the foil. One of the backing members 25, having a lower relative spring constant, provides the bearing with compliance for adequate load capacity and damping characteristics. The other backing member 45, having a higher relative spring constant, establishes and maintains an optimum fluid film geometry under all loading, speed and other operating conditions.

5 Claims, 2 Drawing Figures

HYDRODYNAMIC FLUID FILM THRUST BEARING

DESCRIPTION

1. Technical Field

This invention relates generally to hydrodynamic fluid film thrust bearings and more particularly to such bearings employing one or more foils to establish and maintain a fluid film within the bearing and a resilient backing member accommodating deflections of the foil and excursions of the rotating portion of the bearing.

2. Background Art

Recent efforts to improve high speed bearings such as those used in turbo-compressor units employed in modern air cycle machinery for aircraft cooling and ventilation, have led to the development of fluid film hydrodynamic bearings such as those disclosed and claimed in U.S. Pat. Nos. 4,082,375 and 4,247,155 to Fortmann and 4,116,503 and 4,133,585 to Licht, all assigned to the assignee of the present invention, U.S. Pat. No. 3,636,534 to Barnett, and U.S. Pat. No. 4,225,196 to Gray. Generally, fluid film hydrodynamic bearings such as those disclosed in the above named patents operate on the principle that a rotating member such as a shaft or thrust runner and an adjacent element such as a smooth foil or the like establish and maintain a pressurized, fluid film layer therebetween, the fluid film layer, sometimes referred to as a fluid film wedge, providing lubricated support for the rotating member.

In the case of hydrodynamic thrust bearings similar to the thrust bearing disclosed in the above-noted U.S. Pat. No. 4,225,196 to Gray, the shapes of the fluid wedges are defined by the angular spacing between the rotating member or runner and a plurality of foils circumferentially disposed about a stationary member. It has been the practice to provide this type of bearing with generally stiff, resilient springs or backing members between the foils and the stationary member for maintenance of desired wedge shape under a wide range of loading conditions, the springs resisting foil deflection due to pressurization thereof by the fluid film wedges. However, those skilled in the art will realize that such stiffness comes at the expense of bearing compliancy and therefore, load capacity. Moreover, such stiff springs detract from the ability of the bearing to damp disturbances to the rotating member from, for example, variations or imbalances in loading.

DISCLOSURE OF INVENTION

It is therefore a principle object of the present invention to provide an improved hydrodynamic fluid film thrust bearing.

It is another object to provide such a thrust bearing having adequate support for the wedge-forming foils employed therein.

It is another object to provide such a thrust bearing with adequate foil support as well as enhanced compliance, load capacity and damping characteristics.

These and other objects, which will become more apparent from the following detailed description taken in connection with the appended claims and accompanying drawings, are attained by the hydrodynamic fluid film thrust bearing of the present invention which includes a stationary retaining member (thrust plate), a rotating member (thrust runner) defining with the stationary member, a spacing, one or more foil elements disposed within the spacing, and a pair of uncoupled resilient backing member sets disposed between the foil elements and the stationary member. One of the sets acts to preserve the shapes of fluid wedges established and maintained between the rotating member and foils by resisting foil deflection due to the pressurization thereof. The other set provides adequate compliance characteristics to the bearing for enhanced load capacity and damping characteristics. In the preferred embodiment, the two resilient member sets overlie one another and are disposed on opposite sides of at least one separator plate or foil.

BEST MOST OF CARRYING OUT THE INVENTION

Figure 1:
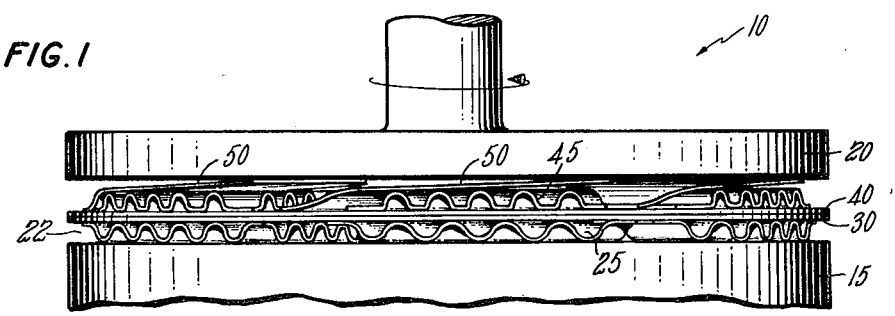
FIG. 1 is a side elevation of the hydrodynamic fluid film thrust bearing of the present invention.
Figure 2:
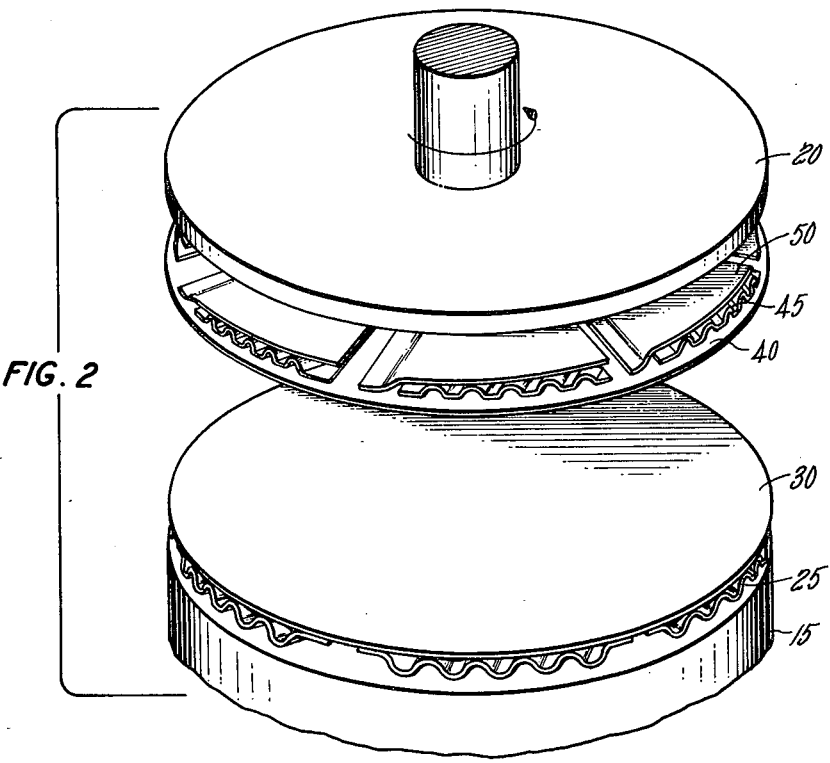
FIG. 2 is an exploded perspective view of the hydrodynamic thrust bearing shown in FIG. 1.

Referring to the drawing, a hydrodynamic fluid film thrust bearing 10 in accordance with the present invention includes a stationary member or base 15, also known as a thrust plate and an overlying thrust runner 20 defining a spacing 22 with the base.

The thrust runner rotates in the direction of the arrow and is adapted for connection to a high speed rotor for such equipment as high speed electric motors or bladed rotors for use in any type of high speed turbo-compressor units such as those employed in air cycle machinery for cooling and pressurizing aircraft cabins.

Overlying base 15, and disposed circumferentially therearound, is a first set of truncated, sector shaped corrugated springs or resilient backing members 25, each comprising a plurality of resilient, surface elevations. Springs 25 may be fixed by brazing, welding or the like either to the base or as shown, to a separator plate or foil 30 of generally flat, annular shape. As those skilled in the art will recognize, springs 25 are resiliently deformable in a direction normal to the plane of the separator foil. A second flat, annular separator plate 40 overlies first separator plate 30 and provides a mounting surface for a second set of truncated sector shaped corrugated springs or resilient backing members 45 each comprising a plurality of spaced, resilient surface elevations and fixed to plate 40 by welding, brazing or other suitable technique. While the corrugations of springs 25 and 45 as illustrated extend in a radial direction, it will be understood that the present invention is not limited to such a configuration of the corrugations. It will be understood that in the case of springs 25 being fixed to base 15, separator plate 30 is not required, plate 40 providing both a mounting surface for springs 45 and a mechanism for the radially outward transfer of loading to springs 25. Also fixed to plate 40 by such techniques and overlying springs 45, are a plurality of truncated, sector shaped foils 50 fixed along corresponding edge portions thereof to plate 40 at locations adjacent the edges of springs 45. As shown, from the fixed edge portions, foils 50 are angled toward runner 20 defining therewith, wedge shaped gaps 55. The foils and springs as well as the separator plates may be formed from any material of suitable strength and resiliency as known in the art. It has been found that Inconel ® Nickel alloy is well suited for such bearings employed in air cycle machines. The dimensions of the base, runner springs and foils will of course depend on expected loadings of the bearing. For example, where the bearing is employed in a 50,000-100,000 RPM turbo-compressor unit for an air cycle air conditioning system, foils 50 are on the order of 0.0127-0.01524 cm (0.005-0.006 in.) thick; separator plates 30 and 40 are each in the neighborhood of 0.0102-0.0127 cm (0.004-0.005 in.) thick. In such an application, the bearing is 7.62-10.16 cm (3-4 in.) in diameter. Additionally, any or all of these members may be coated with any of various low friction coatings for minimization of component wear during start-up.

Those skilled in the art will recognize that bearing 10 operates under the principle of the generation of hydrodynamic pressure in that portion of spacing 22 between runner 20 and foils 50. As the runner rotates in the direction indicated in the drawing, fluid in the boundary layer adjacent the inner surface of the thrust runner is pumped in the direction of the convergence of the wedge shaped gaps 55. This creates high pressure regions adjacent the free edges of the foils and lower pressure regions adjacent the portions fixed to separator plate 40, thereby establishing a film in the gap, this film supporting the thrust runner and preventing the runner from contacting the foil.

In a multi-foil thrust bearing, the springs which back-up the foils serve basically two purposes. First, the springs should provide a backing which establishes a supporting fluid wedge geometry and resists foil deflection under pressure to maintain such an optimum fluid film geometry. Secondly, the spring should provide an overall bearing compliance for damping and load carrying capacity. In a thrust bearing these two requirements are generally inconsistent with a single set of springs. For example, in order to provide proper resistanace to foil deflection and fluid wedge deterioration under operating conditions, the spring requires a relatively high spring rate. However, to provide adequate bearing compliances for overall load capacity and damping of disturbances to the runner, the spring is required to possess a lower spring rate, yet such a lower spring rate militates against maintenance of proper wedge shape and risks contact between the runner and foils under operating conditions, thereby risking damage to those members and failure of the bearing.

Accordingly, it is seen that for adequate compliance and damping, the spring should have a relatively low characteristic spring rate, while for establishment and maintenance of optimum fluid film geometry, under all operating conditions, the spring rate should be relatively high. By the present invention, these requirements are achieved with the first and second uncoupled sets of springs 25 and 45. Springs 45 which back up the foils, are substantially stiffer (of a higher spring rate) than spring 25 disposed adjacent base 30. Accordingly, springs 45 resist deflection of foils 50 due to pressurization thereof by the film layer throughout the various bearing operating conditions to thereby ensure the maintenance of proper fluid wedge shape established by the foils. However, springs 25 lend the bearing sufficient compliance to accommodate movement of the separator plates for adequate damping of imbalances of the runner and accommodation of runner excursions under all loading, speed and operating conditions. Under conditions of extremely severe loading or imbalance wherein springs 25 have compressed to their limits, springs 45 being somewhat stiffer, will have retained sufficient compliance to allow some deflection of the foils under pressurization thereof by the fluid film layer to reduce the risk of high speed contact between the runner and foils and bearing damage attendant therewith.

While as set forth herein, the spring rate of the second set of springs is higher than that of the first set, it will be appreciated that the actual value of such rates and the differences therebetween will depend on the size and expected loading of the thrust bearing as well as the expected imbalances on the rotatable bearing member.

Having thus described the invention, what is claimed is:

1. A hydrodynamic fluid film thrust bearing comprising a stationary thrust plate, a rotatable thrust runner defining with said thrust plate, a spacing therebetween, plural smooth foil elements disposed within said spacing and angularly displaced about said thrust runner, said thrust runner being supported on a pressurized fluid film layer maintained by relative movement between said thrust runner and said foil element, said fluid film thrust bearing further comprising at least one first resilient backing member disposed within said spacing and accommodating by elastic deformation thereof, excursions of said rotating member due to loading and imbalances thereof, said bearing being characterized by:

at least one second resilient backing member having a stiffness greater than that of said first resilient backing member and uncoupled therefrom, said second resilient backing member being disposed between said first resilient backing member and said thrust runner for resisting deflections of said foil element, thereby maintaining an optimum geometry of said fluid film layer under operating conditions.

2. The hydrodynamic fluid film thrust bearing of claim 1, further characterized by said first and second resilient elements comprising corrugated members, each having a plurality of spaced, resilient surface elevations.

3. The hydrodynamic fluid film thrust bearing of claim 1 further characterized by said first and second resilient members being disposed contiguous to, and on opposite sides of at least one smooth separator element.

4. The hydrodynamic fluid bearing of claim 3 further characterized by said first and second resilient backing members comprising corrugated members each underlying said foils.

5. The hydrodynamic fluid film bearing of claim 4 wherein said foils and said resilient backing members are of truncated sector shape.

* * * * *

UNITED STATES PATENT AND TRADEMARK OFFICE
CERTIFICATE OF CORRECTION

PATENT NO. : 4,462,700
DATED : July 31, 1984
INVENTOR(S) : GIRIDHARI L. AGRAWAL

Figure 3:
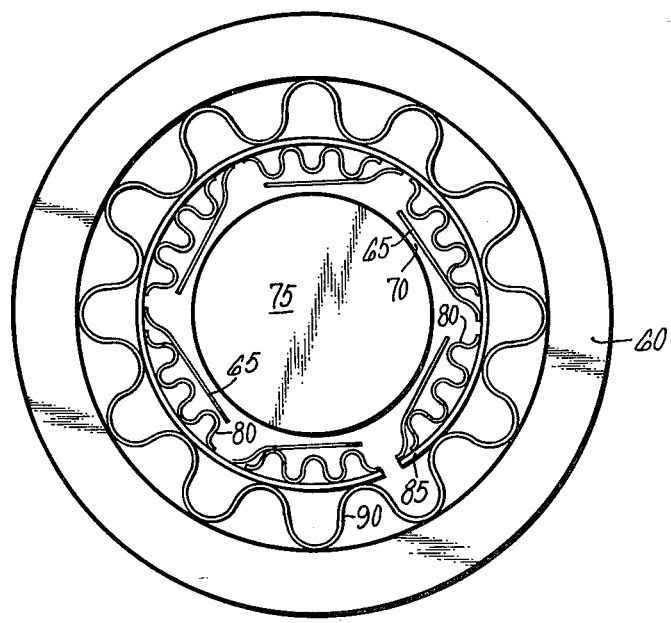

It is certified that error appears in the above-identified patent and that said Letters Patent is hereby corrected as shown below:

Sheet 2 of 2, delete Fig. 3.

Col. 2, line 19, "Most" should be --Mode--.

Signed and Sealed this

Sixteenth Day of April 1985

[SEAL]

Attest:

DONALD J. QUIGG

*Attesting Officer*  *Acting Commissioner of Patents and Trademarks*